United States Patent [19]
Harrison

[11] Patent Number: 5,852,777
[45] Date of Patent: Dec. 22, 1998

[54] METHOD AND APPARATUS FOR SCREENING A CALL IN A WIRELESS SYSTEM

[75] Inventor: Peter Harrison, Ascot, United Kingdom

[73] Assignee: Nokia Mobile Phones Limited, Espoo, Finland

[21] Appl. No.: 661,863

[22] Filed: Jun. 11, 1996

[51] Int. Cl.[6] .................................................. H04M 3/42
[52] U.S. Cl. ........................ 455/414; 455/414; 455/434; 455/435; 455/436
[58] Field of Search ..................................... 379/112, 201; 455/414, 415, 416, 445, 567, 461, 422, 552, 553, 435, 455, 434

[56] References Cited

U.S. PATENT DOCUMENTS

| | | | |
|---|---|---|---|
| 5,329,578 | 7/1994 | Brennan et al. | 455/414 |
| 5,469,496 | 11/1995 | Emery et al. | 455/414 |
| 5,504,804 | 4/1996 | Widmark et al. | 455/461 |
| 5,548,636 | 8/1996 | Bannister et al. | 455/414 |
| 5,592,533 | 1/1997 | McHenry et al. | 455/461 |

*Primary Examiner*—Wellington Chin
*Assistant Examiner*—Thuan Nguyen
*Attorney, Agent, or Firm*—Brian T. Rivers

[57] ABSTRACT

A method and apparatus for screening a call in a telecommunications network having a first system comprising a first subscriber station and a second system comprising a second subscriber station, associated with the first subscriber station by a predetermined relationship. Each subscriber station in the first system has a unique subscriber number and the second system having a general number for all subscriber stations. In the method and apparatus, call setup requests for calls to the general number of the second system are screened to determine if the call was originally made to the number of the first subscriber station and then forwarded to the general number of the second system, or if the call was originally made to the general number. If the call was originally made to the first subscriber station, only the second subscriber station is alerted. If the call was originally made to the general number, all the subscriber stations in the second system are alerted.

15 Claims, 1 Drawing Sheet

METHOD AND APPARATUS FOR SCREENING A CALL IN A WIRELESS SYSTEM

FIELD OF THE INVENTION

This invention relates to screening calls in telecommunications systems and, more particularly, to an apparatus and method for screening a call made to a common subscriber number assigned to a system having a plurality of subscriber stations.

BACKGROUND OF THE INVENTION

Developments in wireless systems technology have result in a being available for use by system subscribers. Many different types of wireless systems now exist or have been proposed at the concept stage. These wireless systems include systems in which each system subscriber uses a handset that has a unique subscriber number assigned to it. Calls made to a particular subscriber number of the system, from a public telephone network or otherwise, are received at the system and directed to the handset that is assigned the particular number. Conventional cellular and PCS systems are examples of this type of system. Systems also exist in which the system is assigned a general number. In this case calls made to the system general number, from a public telephone network or otherwise, are directed to all active handsets in the system. A residential cordless phone system having multiple handsets is an example of this type of system.

Developments in wireless systems technology have also made it possible to use wireless systems to offer system subscribers a variety of new services. For example, these new services include a cellular/PCS wireless residential network concept in which a system subscriber is assigned a handset that may be operated in either a wide area cellular/PCS system or the subscribers residential cordless system. In this type of network each of the cellular/PCS and residential cordless systems is typically connected to the public switched telephone network (PSTN).

In the cellular/PCS wireless residential network the subscriber may roam about the coverage area of the cellular/PCS system while using the handset to initiate and receive calls over the radio channels of the cellular/PCS system. The subscriber may also move into the coverage area of the subscriber's residential cordless system and make and receive calls over the residential cordless system radio channels. Selection between which of the two systems the subscriber operates in may be done manually by the subscriber, or, automatically by the network. For example, The cellular/PCS residential system could be designed so the subscriber's handset was switched from communications on the cellular/PCS radio channels air interface to communications on the cordless system radio channels when signal strength levels received at the handset on the radio channels of the residential cordless system became greater than a certain threshold level.

In a typical cellular/PCS residential system a subscriber may be assigned two phone numbers within the PSTN. One phone number would be assigned as the subscriber's cellular/PCS number and the other phone number would be assigned to the wireline connection to the residential cordless system. All calls made to the cellular/PCS number are directed to the cellular/PCS system. If the subscriber is actively using the handset within the cellular/PCS system, i.e., is registered, the call is then directed to the handset within the cellular/PCS system. If the subscriber is not active (not registered) within the cellular/PCS system, calls made to the cellular/PCS number are directed by the cellular/PCS system to the residential cordless number. Calls directed to the residential cordless number are received at the base station or base stations of the cordless system. Handsets active in the cordless system are then alerted. If the subscriber's handset is active in the cordless system the subscriber's handset will be alerted. If there is more than one cordless handset active in the cordless system, each of the other active handsets will also be alerted. In either case, when handsets active in the cordless system are alerted, it is not known if the incoming call was originally made to the cellular/PCS number or to the residential cordless number.

In certain instances the subscriber may desire that the cellular/PCS number be used solely for one purpose, such as a business number, and that the residential cordless number be used for a second purpose, such as a family phone number. In cases such as these the subscriber may desire that the call to the residential cordless number be distinguishable as a forwarded business call or family call before the call is answered at any of the handsets. It may also be desirable that business calls are received in the residential cordless system with the minimum amount of disturbance for other people in the residence, for example the subscriber may desire that only the dual mode handset be alerted when a business call is received in the residential cordless system.

It would be possible to distinguish between calls made to the business number and residential cordless number by using distinctive ring tones. In this-solution business calls could be assigned a unique ringing tone or timing sequence and residential calls could be assigned another ring tone or timing sequence. People present when a call was received in the residential cordless system could tell from the ringing tone which number was being called. In this solution an additional phone number and some type of control circuitry connected to the line for the residential cordless number are utilized. Calls made to the additional number and the residential cordless system would both be directed over separate lines to the control circuitry. When a call was received by the control circuitry for either of the numbers, the control circuitry would provide a distinctive ringing tone associated with that called number to the residential cordless system. To provide distinctive ringing to the cellular/PCS number and residential number, when a call to the subscriber was forwarded from the cellular/PCS system it would be forwarded to the additional phone number instead of directly to the residential cordless number. A forwarded business call would then have a different ring in the residential cordless system than a residential call. This solution however requires the additional number and control circuitry, and does not prevent the disturbance caused by ringing all active handsets in the residential cordless system at once.

SUMMARY OF THE INVENTION

The present invention provides a method and apparatus for screening a call in a telecommunications network having a first system and a second system, with the second system having a single general phone number for subscriber stations. In the method and apparatus taught by this invention, call set up messages received at the general number of the second system are screened to determine if the call was originally directed to an individual phone number of the first system and then forwarded, or, if the call was made directly to the general number of the second system. The call is then selectively directed and subscriber stations active within the second system are selectively alerted, depending on whether the call was forwarded from the first system or was made directly to the number of the second system.

The method and apparatus allows the user of a subscriber station of the second system to have the subscriber station alerted dependent on the number to which a call was originally directed. This prevents inconveniences that occur when all subscriber stations of the second system are alerted upon receiving a call to the general number of the system. For example, only particular subscriber stations of the second system could be alerted when receiving calls forwarded from a certain business number while all subscriber stations could be alerted when receiving all other types of calls. Particular subscriber stations could be set aside for business use, and business calls would not disturb all users of subscriber stations in the second system.

In an embodiment of the invention, the method and apparatus is implemented in a telecommunications network having a PCS system and a residential cordless phone system. The telecommunications network provides a dual mode service in which a subscriber receives service from either the PCS system or the residential cordless phone system by using a dual mode handset that is capable of operating in either system. The PCS system and the residential cordless system are each connected to an integrated services digital network (ISDN) implemented in a public switched telephone network (PSTN). When operating in the PCS system the subscriber receives calls that are directed to a unique PCS number assigned to the subscriber. This PCS number is assigned for a specific use, such as a business number. When operating in the residential cordless system, the subscriber receives calls that are directed to a general phone number of the cordless system. The number of the cordless system may be also used by the subscriber for a specific purpose, such as a residential number. When the subscriber is not active in the PCS system calls made to the subscriber's PCS number are forwarded and directed to the general number of the residential cordless system.

When a call setup request for a call to the general number of the residential cordless system is received in the residential cordless system, an information element included in data exchanged over the PSTN is examined to determine the originally called number, i.e., the number the call was originally directed to before any forwarding. If the data indicates that the originally called number was the subscriber's PCS number, the residential cordless system selectively alerts only the subscriber's dual mode handset, if the dual mode handset is active in the residential system. If the data indicates that the originally called number was the general number of the residential cordless system, the residential cordless system alerts all handsets active in the residential cordless system. Alternatively, only a subset of the active handsets may be alerted when it is determined that the originally called party is the residential cordless number.

BRIEF DESCRIPTION OF THE DRAWINGS

A more complete understanding of the method and apparatus of the invention may be had by reference to the following Detailed Description, when read in conjunction with the accompanying drawings wherein.

DETAILED DESCRIPTION OF THE INVENTION

Figure 1:
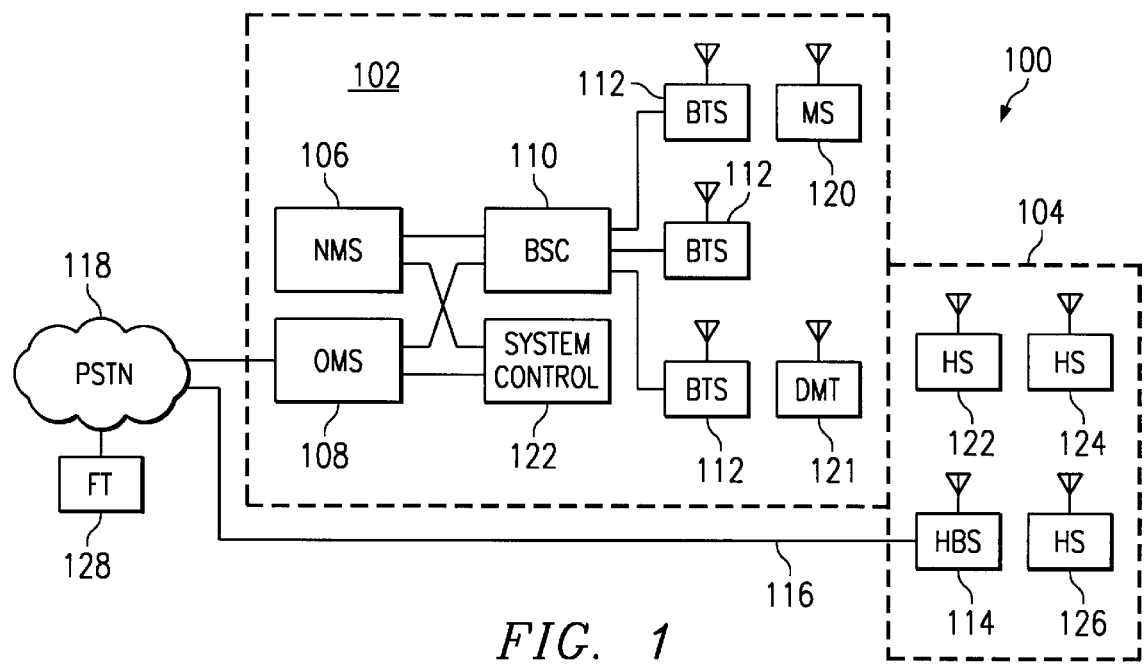
FIG. 1 illustrates a telecommunication network according to an embodiment of the invention.

FIG. 1 illustrates a telecommunications network 100 according to an embodiment of the invention. Network 100 comprises personal communications system (PCS) 102 and cordless telephone system 104. Both PCS 102 and cordless telephone system 104 are connected to an integrated services digital public switched telephone network (PSTN) 118. The PSTN 118 may include other subscriber stations such as fixed terminal (FT) 128. PCS 102 comprises network management system (NMS) 106, operations maintenance system (OMS) 108, base station controller (BSC) 110, base transceiver stations (BTSS) 112 and system controller 122. The interconnections between the components of PCS 102 are as well known in the art. A system user may move about the coverage area of PCS 102 while using a transceiving device to maintain communications with PCS 102 over system radio channels. Each of BTSs 112 has a separate geographic coverage area within which it provides the radio channel air interface between PCS 102 and transceiving devices operating within PCS 102 . In FIG. 1, the transceiving devices, in particular mobile station (MS) 120 and dual mode telephone (DMT) 121, are shown to be operating within the coverage area of BTSs 112. PCS system 102 is shown to include three BTSs 112 and two transceiving devices, MS 120 and DMT 121, but may include more or less BTSs or, more or less transceiving devices than are shown.

Cordless telephone system 104 comprises a home base station (HBS) 114, that is connected to PSTN 118 through a RJ11 connection 116, and handsets (HS) 122, 124 and 126. In cordless telephone system 104, a system user may utilize HSs 122, 124 and 126 to make and receive calls while within the coverage area of HBS 114. Although cordless telephone system 104 is shown to include only one base station, HBS 114, and three handsets, HS 122, 124 and 126, cordless telephone system 104 could include more than one base station and more or less handsets than are shown.

In the embodiment shown in FIG. 1, PCS system 102 may operate according to the Personal Communications Services Air Interface Specification, J-STD-007 (PCS 1900) in the downlink frequency band of 1930–1990 Mhz and in the uplink frequency band of 1850–1910 Mhz. Alternatively, PCS system 102 could comprise a cellular type system operating according to any one of the cellular standards, such as AMPS, GSM or US-TDMA. Cordless telephone system 104 may operate according to the TIA/EIA 662 standard developed by the telecommunication industry association's subcommittee TR41.6 for personal wireless telecommunications (PWT) in the unlicensed frequency band of 1910–1930 Mhz as specified for PWT, and may also be capable of operating at other frequencies in the 1850–1990 Mhz range.

DMT 121 is a dual mode telephone that can be operated in either PCS mode, for use in PCS system 102, or in PWT mode for use in cordless telephone system 104. A user of DMT 121 may select PCS mode to receive phone service while away from his residential area. and in the service area of PCS system 102. If the user is near his residence and within the coverage area of HBS 114, he may select PWT mode to receive phone service. As an alternative, the selection between PCS mode and PWT mode could be done automatically by DMT 121, depending on the relative strengths of signals received from or transmitted to the two systems, or based on other criteria.

In the embodiment of FIG. 1, MS 120 and DMT 121 of PCS 102 are each assigned a unique phone number of PSTN 118 for use in PCS 102. Cordless telephone system 104 is also assigned a phone number of PSTN 118. The signaling within PSTN 118 follows the digital subscriber signaling system number 1 (DSS1) protocol as specified in the American National Standards Institute (ANSI) publication Number TI.607–1990 entitled "Integrated Services Digital Network (ISDN)—Layer 3 Signaling Specification for Circuit-Switched Bearer Service for DSS1" including the modifications to the protocol as specified in ANSI publication TI. 610–1994.

Call set up messages received in PSTN 118 and made to the phone numbers of MS 120 and DMT 121 are directed to PCS 102 and, then, PCS 102 initiates call setup to MS 120 or DMT 121, respectively. Call set up messages received internally within PCS 102 requesting call setup to a phone number assigned to MS 120 or DMT 121 are also directed to to MS 120 or DMT 121.

Call setup messages received in PSTN 118 for the phone number of cordless telephone system 104 are directed to HBS 114. When DMT 121 is not active within PCS 102, call setup messages received in PCS 102 for the phone number of DMT 121 are forwarded by PCS 102 through PSTN 118 to cordless telephone system 104 and also directed to HBS 114.

When a call setup message is received at HBS 114 the call is screened to determine the original called number. If the call setup was originally directed to the phone number of HBS 114, cordless handsets 122,124 and 126, and DMT 121 are alerted. If the call setup was originally directed to the phone number of DMT 121, only DMT 121 is alerted. Calls originally made to the phone number of DMT 121 will therefore not be answered at cordless handsets 122, 124 or 126, nor will users of these handsets be disturbed by calls made originally to DMT 121.

The invention can be described with reference to the embodiment of FIG. 1 and using a call scenario in which a call is initiated from FT 128 of PSTN to the cellular number of DMT 121 while DMT 121 is not active in PCS 102.

When a user of FT 128 initiates a call to the phone number of DMT 121 by dialing the number, an ISDN call setup message is transmit to PSTN 118 from FT 128. The ISDN message contains the calling party number field and the called party number field. The calling party number field is set to the PSTN number of FT 128. The called party number field is set to the phone number of DMT 121.

PSTN 118 receives the ISDN message and transmits it to OMS 108. Because DMT 121 is not active in PCS 102, the call setup message is automatically forwarded to the phone number of HBS 114 through PSTN 118. Upon the call forwarding to HBS 114, the called party number field is set to the phone number of HBS 114 and the phone number of DMT 121 is moved to the original called number field of the setup message.

Figure 2:
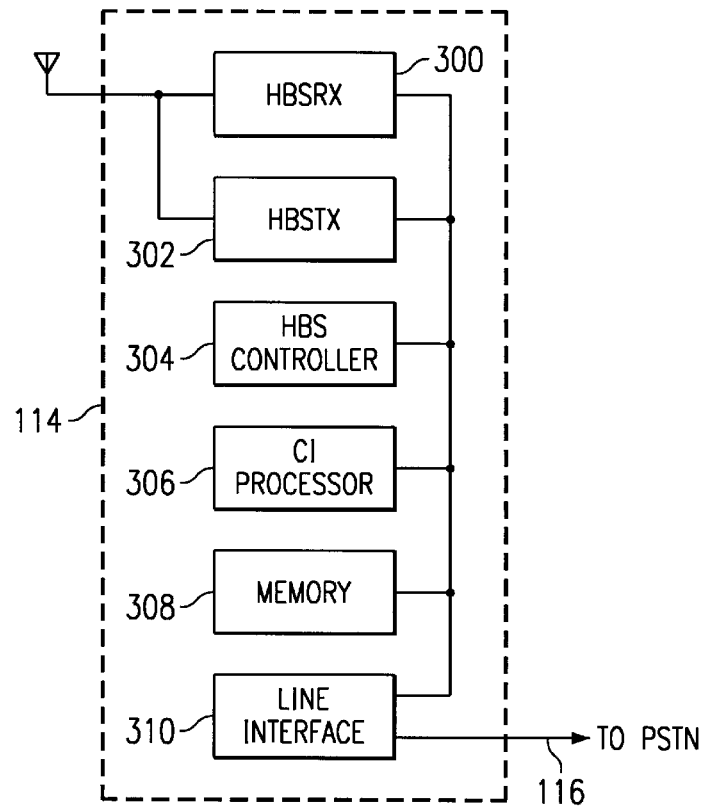
FIG. 2 is a functional level block level diagram showing portions of a home base station according to an embodiment of the invention.

Referring now to FIG. 2, therein is shown a functional block level diagram showing portions of a home base station according to the embodiment of FIG. 1. HBS 114 comprises HBS receiver (HBSRX) 300, HBS transmitter (HBSTX) 302, HBS controller 304, control Processor 306, memory 308, and line interface 310. The call setup message is received over RJ11 connection 116 by line interface 310. The call setup message is then transferred to control processor 306. Control processor 306 reads the original called number field of the setup message and compares it with the cellular phone number of DMT 121 which is stored in memory 308. Because the numbers in the original called number field and the cellular phone number of DMT 121 match, control processor 306 then determines a PWT international portable user identity (IPUI) number for DMT 121 that is associated with the cellular phone number of DMT 121 in memory 308. Processor 306 then generates the appropriate commands, according to PWT protocol, to HBS controller 304 so that only DMT 121 is alerted as a result of receiving the call setup message originally directed to the cellular number of DMT 121. Also control processor 306 generates the appropriate commands so that only DMT 121 is connected to the call if the user of DMT 121 answers.

In a call scenario where the original called number field of the call setup message does not match the cellular number for DMT 121, cordless handsets 122, 124 and 126 and DMT 121 are alerted. Alternatively, only cordless handsets 122, 124 and 126 may be alerted if the original called number field of the call setup message does not match the cellular number for DMT 121.

Since only DMT 121 is alerted when a call has been forwarded from the cellular number of DMT 121, the users of cordless handsets 122, 124 or 126 DMT 121 will not be disturbed by calls made originally to DMT 121. Also, the user of DMT 121 will know when a business call or a regular call to his residence is being received by observing which of the handsets ring.

In an alternative embodiment the original called number field may be compared with another number, or numbers, as well as being compared with the cellular phone number of DMT 121. For example, if the user of DMT 121 had a fixed line business phone with a separate fixed line business number, the fixed line business number may be stored in memory 108 along with the cellular phone number of DMT 121 and also associated with the PWT IPUI of DMT 121. When a call is received, the fixed line business number of the fixed line business phone and the cellular phone number of DMT 121 could then be both compared with the original called number field, and only DMT 121 alerted if either of the two numbers was the original called number.

Although the method and apparatus of the present invention has been illustrated and described with regard to presently preferred embodiments, it will be understood by those skilled in the art that numerous modifications and substitutions may be made to the embodiments shown, and that numerous other embodiments of the invention may be implemented, without departing from the spirit and scope of the invention as defined in the following claims.

What is claimed is:

1. In a telecommunications network having a first system comprising a first plurality of subscriber stations, each assigned a unique subscriber number and a second system comprising a second plurality of subscriber stations, all assigned a single common subscriber number, wherein a first and second subscriber station of said first and second plurality of subscriber stations, respectively, are associated by a predetermined relationship, a method of screening a call, said method comprising the steps of:

receiving a setup request for a call to the common subscriber number assigned to said second plurality of subscriber stations;

determining whether said setup request was forwarded following a call setup attempt to a selected subscriber number assigned to said first subscriber station; and, if it is so determined, selectively alerting only said second subscriber station of said second plurality of subscriber stations;

else, alerting each of the second plurality of subscriber stations.

2. The method of claim 1, wherein said first system and said second system are connected through an integrated services digital network, ISDN, and said setup request comprises an ISDN call setup message, and wherein said step of determining comprises reading data in said call setup message, said data indicating an original called number.

3. The method of claim 2, wherein said data comprises an original called number field of said call setup message.

4. The method of claim 3, wherein said step of determining comprises comparing said original called number with at least one subscriber number that is stored within said second system.

5. The method of claim 1, wherein said first system comprises a first wireless system and said second system comprises a second wireless system, and wherein said first subscriber station and said second subscriber station each comprise a portion of a dual mode mobile station, said dual mode mobile station operative in both said first and second wireless systems.

6. The method of claim 5, wherein said first wireless system comprises a personal communications system, PCS, and said second wireless system comprises a cordless phone system.

7. The method of claim 1, further comprising, before said step of receiving a setup request for a call to the common subscriber number, the steps of:

receiving a first setup request, said first setup request being for a call to a selected subscriber number assigned to a first subscriber station, wherein said first subscriber station is one of the first plurality of subscriber stations;

determining whether said first subscriber station is active in said first system; and in response to a negative determination;

forwarding a second setup request, said second setup request being for a call to the common subscriber number assigned to the second plurality of subscriber stations;

and, wherein said step of receiving a setup request for a call to the common subscriber number comprises receiving said second setup request, and said step of determining whether said second setup request was forwarded comprises determining whether said second setup request was forwarded following a call setup attempt to said selected subscriber number assigned to said first subscriber station.

8. The method of claim 7, wherein said first system comprises a first wireless system and said second system comprises a second wireless system, and wherein said first subscriber station and said second subscriber station each comprise a portion of a dual mode mobile station, said dual mode mobile station being capable of operation in both said first and second wireless systems.

9. The method of claim 8, wherein said first system and said second system are connected through an integrated services digital network, ISDN, and said second setup request comprises an ISDN call setup message, and wherein said step of determining comprises reading data in said call setup message, said data indicating an original called number.

10. A telecommunications network comprising:

a first system comprising a first plurality of subscriber stations, each assigned a unique subscriber number, said first plurality of subscriber stations comprising a first subscriber station assigned a first subscriber number;

a second system comprising a second plurality of subscriber stations, all commonly assigned a second subscriber number, said second plurality of subscriber stations comprising a second subscriber station wherein said second subscriber station is associated with said first subscriber station in a predetermined relationship; and a controller, said controller for receiving a setup request for a call to said second subscriber number, determining if said setup request was forwarded following a call setup attempt to said first subscriber number assigned to said first subscriber station; and if it is so determined, selectively alerting only said second subscriber station of said second plurality of subscriber stations;

else, said controller for alerting each of said second plurality of subscriber stations.

11. The telecommunication network of claims 10, wherein said second system comprises a cordless telephone network.

12. The telecommunications network of claim 10, wherein said call setup request comprises an ISDN call setup message and wherein said controller determines whether said call setup request was forwarded following a call setup request to said first subscriber number by comparing an original called number field of said call setup message with at least one subscriber number included in a data base.

13. The telecommunications network of claim 10, wherein said first and second systems are connected through an integrated services digital network, ISDN, and said call setup requests to said first and second subscriber numbers comprise ISDN call setup messages, and wherein said controller determines whether said call setup request for a call to said second subscriber number was forwarded following a call setup request for a call to said first subscriber number by comparing an original called number field of said call setup request for a call to said second subscriber number with at least one subscriber number included in a data base.

14. The telecommunications network of claim 10, wherein said first system comprises a first wireless system and said second system comprises a second wireless system, and wherein said first subscriber station and said second subscriber station each comprise a portion of a dual mode mobile station, said dual mode mobile station being capable of operation in both said first and second wireless systems.

15. The telecommunications network of claim 10, wherein said first wireless system comprises a personal communications system (PCS), and said second wireless system comprises a cordless phone system.

* * * * *